US008885092B2

(12) United States Patent
Mori et al.

(10) Patent No.: US 8,885,092 B2
(45) Date of Patent: Nov. 11, 2014

(54) CAMERA DEVICE, EXPOSURE CONTROL METHOD, AND PROGRAM

(75) Inventors: Yuichiro Mori, Fukuoka (JP); Shoji Hatta, Fukuoka (JP); Kosuke Hosoi, Fukuoka (JP); Yasuji Nakamura, Fukuoka (JP); Ryoko Kato, Kanagawa (JP)

(73) Assignee: Panasonic Corporation, Osaka (JP)

( * ) Notice: Subject to any disclaimer, the term of this patent is extended or adjusted under 35 U.S.C. 154(b) by 420 days.

(21) Appl. No.: 13/321,991

(22) PCT Filed: May 7, 2010

(86) PCT No.: PCT/JP2010/003130
§ 371 (c)(1),
(2), (4) Date: Jan. 20, 2012

(87) PCT Pub. No.: WO2010/137241
PCT Pub. Date: Dec. 2, 2010

(65) Prior Publication Data
US 2012/0113297 A1   May 10, 2012

(30) Foreign Application Priority Data

May 25, 2009   (JP) ................................ 2009-124924

(51) Int. Cl.
| G03B 7/00 | (2014.01) |
| H04N 5/235 | (2006.01) |
| H04N 5/355 | (2011.01) |
| H04N 5/232 | (2006.01) |
| H04N 5/335 | (2011.01) |
| H04N 5/238 | (2006.01) |
| G06K 9/00 | (2006.01) |
| G06K 9/40 | (2006.01) |

(52) U.S. Cl.
CPC ........... *H04N 5/335* (2013.01); *H04N 5/35581* (2013.01); *H04N 5/2357* (2013.01); *H04N 5/23219* (2013.01)
USPC ..... 348/362; 348/367; 348/221.1; 348/229.1; 382/118; 382/274

(58) Field of Classification Search
CPC .......................... H04N 5/235; H04N 5/23229
USPC ........... 348/362–369, 169, 221.1, 229.1, 234; 382/103, 118, 190, 195, 274–275
See application file for complete search history.

(56) References Cited

U.S. PATENT DOCUMENTS

| 7,466,358 B1 * | 12/2008 | Kusaka et al. ................ 348/362 |
| 2004/0233307 A1 | 11/2004 | Tsujino |
| 2009/0060379 A1 * | 3/2009 | Manabe ....................... 382/274 |
| 2009/0087099 A1 | 4/2009 | Nakamura |

FOREIGN PATENT DOCUMENTS

| JP | 06-141229 | 5/1994 |
| JP | 2001-86401 | 3/2001 |

(Continued)

OTHER PUBLICATIONS

U.S. Appl. No. 13/321,747 to Satoru Oyabu et al., filed Nov. 21, 2011.

*Primary Examiner* — Sinh Tran
*Assistant Examiner* — Christopher K Peterson
(74) *Attorney, Agent, or Firm* — Greenblum & Bernstein, P.L.C.

(57) ABSTRACT

A camera device (1) includes an imaging unit (2) which outputs a long exposure signal and a short exposure signal in one field period. A face detection unit (8) detects a face area from an image captured by the imaging unit (2). The weighting processing unit (12) applies a weighting process to luminance data of the long exposure signal in the detected face area using a weighting constant for reducing the luminance level of the long exposure signal. If the luminance level of the weighting-processed long exposure signal rises to a predetermined saturation level or higher, an exposure control unit (15) performs exposure control using the long exposure signal and the short exposure signal. This can suppress occurrence of a noise due to a short exposure signal (flickering) in the face area, thereby improving visibility in the face area.

11 Claims, 4 Drawing Sheets

(56) References Cited

FOREIGN PATENT DOCUMENTS

| JP | 2003-78921 | 3/2003 |
| JP | 2003-298929 | 10/2003 |
| JP | 2009-59119 | 3/2009 |
| JP | 2009-89077 | 4/2009 |

\* cited by examiner

CAMERA DEVICE, EXPOSURE CONTROL METHOD, AND PROGRAM

TECHNICAL FIELD

The present invention relates to a camera device that includes a function of expanding a dynamic range, and particularly to a camera device that performs exposure control using a long exposure signal and a short exposure signal.

BACKGROUND ART

An image captured by a camera device, such as a surveillance camera, may include a bright part (e.g. a sunny place) and a dark part (e.g. a shady place). In a case where a difference in brightness between the bright and dark parts is large, if the lens aperture value is set (adjusted) with reference to the bright part, the dark part becomes invisible. In contrast, if the lens aperture value is set (adjusted) with reference to the dark part, the bright part becomes invisible. Thus, conventionally, a camera device has been proposed that includes a function that performs exposure control using two image signals with different exposure times (a long exposure signal and a short exposure signal) and thereby expands the dynamic range (e.g. see Patent Literature 1).

In this conventional exposure control method, if the luminance level of a long exposure signal (also referred to as a LONG signal) exceeds a predetermined luminance level (saturation level), the long exposure signal and the short exposure signal (also referred to as a SHORT signal) are synthesized by a video processing, thereby expanding the dynamic range. More specifically, an image where the dark part is clearly visible (long exposure signal) and an image where the bright part is clearly visible (short exposure signal) are synthesized by a digital processing. Accordingly, an image where both the bright and dark parts are clearly visible can be acquired.

However, in the conventional exposure control method, in a case where the difference in brightness between the bright and dark parts is significantly large (e.g., a case where a bright light source (such as the sun or a light) is in a screen), a noise due to a short exposure signal (flickering) may be caused. In a case where the amount of light from a light source varies with a significantly short period (e.g., the amount of light of a fluorescent tube varies with a frequency of 60 Hz), if the exposure time of the short exposure signal is a certain length (e.g. $1/100$ second), the amount of light per frame is flattened (averaged) to a certain extent. More specifically, although the amount of light from the light source varies with a period of $1/60$ second, the amount of light is integrated for an exposure time of $1/100$ second. Accordingly, the integrated value of the amount of light becomes a substantially same value among frames. However, in the case where the difference in brightness between the bright and dark parts is significantly large, the exposure time of the short exposure signal becomes significantly short (e.g. $1/1000$ second). In this case, the variation of the amount of light becomes perceptible. That is, even if the amount of light is integrated for the significantly short exposure time of $1/1000$ second, the integrated value of the amount of light also varies for every frame, which causes a noise on the screen (flickering).

Incidentally, in a case of employing a camera device as a surveillance camera, the "face of a figure" taken in a captured image (surveillance image) is a very important part. It is necessary to suppress a noise in this face part as much as possible. On the other hand, even if illumination such as of a light appears in the surveillance image, the part of the illumination is not so important. However, in the conventional exposure control method, in a case where a bright light source (e.g. a light) appears together in a surveillance image, the dark part (the face part which is very important) includes the aforementioned noise (noise due to the short exposure signal) in order to make the bright part (the part of the light source which is not important) clearly visible.

CITATION LIST

Patent Literature

Patent Literature 1: Japanese Patent Laid-Open No. 6-141229

SUMMARY OF INVENTION

Technical Problem

The present invention is made in the aforementioned background. It is an object of the present invention to provide a camera device capable of suppressing occurrence of a noise due to a short exposure signal (flickering) in a face area and improving visibility in the face area.

Solution to Problem

One aspect of the present invention is a camera device. This camera device includes: an imaging unit outputting a long exposure signal that is an image signal with a long exposure time and a short exposure signal that is an image signal with a short exposure time in a predetermined unit field period; a face detection unit that detects a face area from an image captured by the imaging unit; a weighting processing unit that applies a weighting process to luminance data of the long exposure signal in the detected face area using a weighting constant for reducing a luminance level of the long exposure signal; and an exposure control unit that performs exposure control using the long exposure signal and the short exposure signal if the luminance level of the weighting-processed long exposure signal rises to a predetermined saturation level or higher.

Another aspect of the present invention is an exposure control method. This exposure control method is used in a camera device including an imaging unit outputting a long exposure signal that is an image signal with a long exposure time and a short exposure signal that is an image signal with a short exposure time in a predetermined unit field period, and includes: detecting a face area from an image captured by the imaging unit; applying a weighting process to luminance data of the long exposure signal in the detected face area using a weighting constant for reducing the luminance level of the long exposure signal; and performing exposure control using the long exposure signal and the short exposure signal if the luminance level of the weighting-processed long exposure signal rises to a predetermined saturation level or higher.

Still another aspect of the present invention is a program. This program is for exposure control in a camera device including an imaging unit outputting a long exposure signal that is an image signal with a long exposure time and a short exposure signal that is an image signal with a short exposure time in a predetermined unit field period, and causes a computer to perform: a process of detecting a face area from an image captured by the imaging unit; a process of applying a weighting process to luminance data of the long exposure signal in the detected face area using a weighting constant for reducing the luminance level of the long exposure signal; and a process of performing exposure control using the long exposure signal and the short exposure signal if the luminance level of the weighting-processed long exposure signal rises to a predetermined saturation level.

As will be described below, the present invention includes yet another aspect. Accordingly, the disclosure of this invention is intended to provide a part of aspects of the present invention, but is not intended to limit the scope of the invention herein described and claimed.

DESCRIPTION OF EMBODIMENTS

Figure 1:
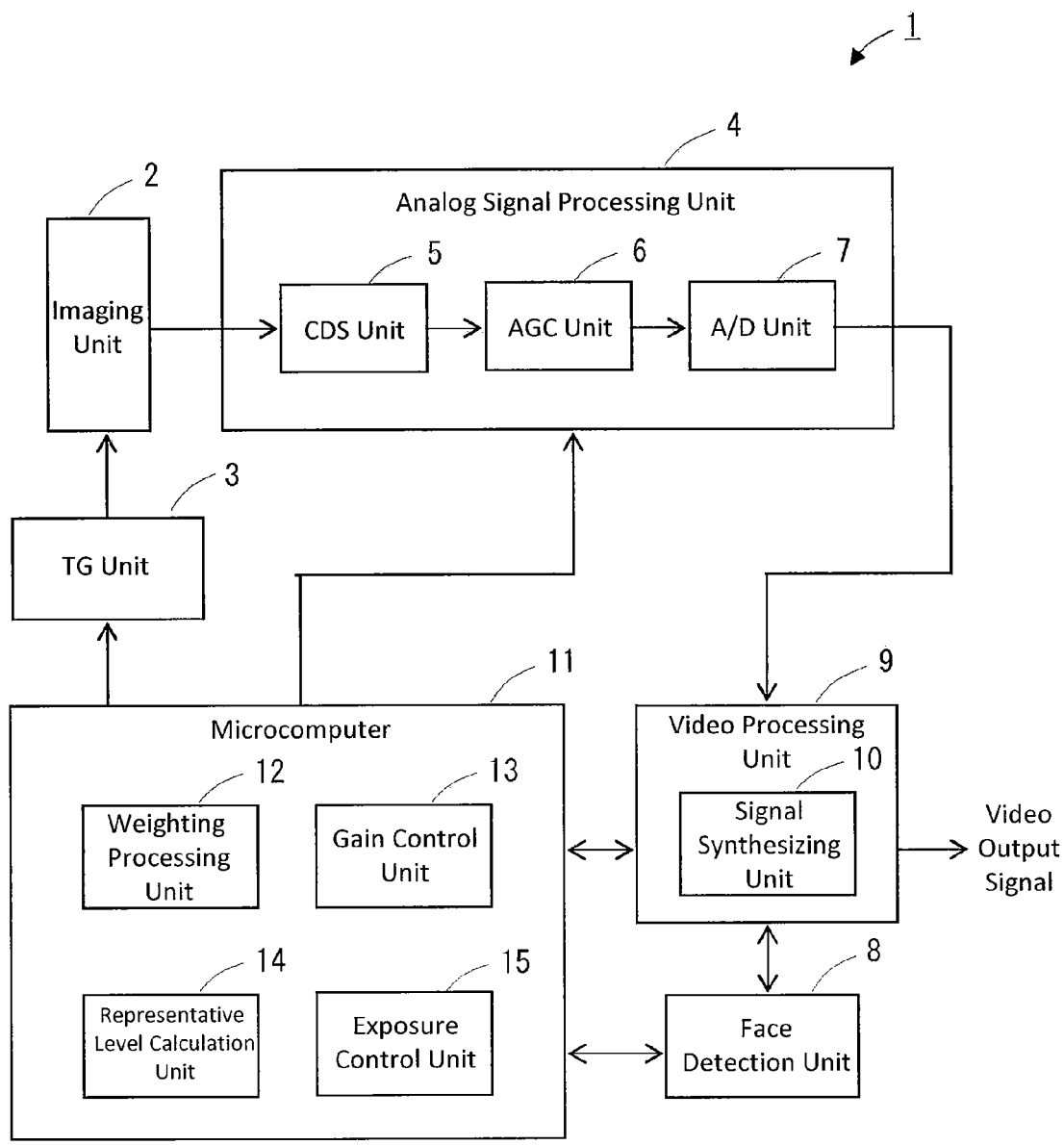
FIG. 1 is a block diagram of a camera device of an embodiment of the present invention.

The present invention will hereinafter be described in detail. Note that the following detailed description and accompanying drawings do not limit the invention.

A camera of the present invention includes: an imaging unit outputting a long exposure signal that is an image signal with a long exposure time and a short exposure signal that is an image signal with a short exposure time in a predetermined unit field period; a face detection unit that detects a face area from an image captured by the imaging unit; a weighting processing unit that applies a weighting process to luminance data of the long exposure signal in the detected face area using a weighting constant for reducing a luminance level of the long exposure signal; and an exposure control unit that performs exposure control using the long exposure signal and the short exposure signal if the luminance level of the weighting-processed long exposure signal rises to a predetermined saturation level or higher.

According to this configuration, if the face area is detected in the captured image, the weighting process for reducing the luminance level of the long exposure signal in the face area is performed. As a result, in the face area, the luminance level of the long exposure signal is suppressed not to exceed a predetermined saturation level, which prevents exposure control using the long exposure signal and the short exposure signal from being performed. This can suppress occurrence of the noise due to the short exposure signal (flickering) in the face area. Accordingly, visibility in the face area (particularly required in a surveillance camera etc.) is improved.

Further, the camera device of the present invention may include a configuration in which the weighting processing unit applies the weighting process to luminance data of the long exposure signal if the luminance level of the long exposure signal in the detected face area is lower than a predetermined threshold level.

According to this configuration, if the luminance of the face area is low (if it is dark), the weighting process for reducing the luminance level of the long exposure signal in the face area is performed, which suppresses occurrence of a noise due to the short exposure signal (flickering) in the face area. Accordingly, visibility in the face area in the dark part (particularly required in a surveillance camera etc.) is improved.

The camera device of the present invention may have a configuration including a face area gain control unit that increases a gain of the long exposure signal in the face area in the image if the luminance level of the long exposure signal in the detected face area is lower than a predetermined threshold level.

According to this configuration, if the luminance in the face area is low (if it is dark), a control of increasing the gain of the long exposure signal in the face area is performed. Accordingly, visibility in the face area in the dark part (particularly required in a surveillance camera etc.) is improved.

The camera device of the present invention may have a configuration including an entire area gain control unit that increases a gain of the long exposure signal in the entire area of the image if the luminance level of the long exposure signal in the detected face area is lower than a predetermined threshold level.

According to this configuration, if the luminance in the face area is low (if it is dark), a control of increasing the gain of the long exposure signal in the entire area of the image is performed. Accordingly, visibility in the face area in the dark part (particularly required in a surveillance camera etc.) is improved. In this case, the gain control can be applied also to a part that is not dark. However, appropriate exposure control using the long exposure signal and the short exposure signal is applied to this part (the part that is not dark).

The camera device of the present invention may have a configuration that further includes a representative level calculation unit that calculates a representative luminance level of the long exposure signal in the face area on the basis of the luminance data of the weighting-processed long exposure signal, wherein if the representative luminance level rises to the saturation level or higher, the exposure control unit performs exposure control using the long exposure signal and the short exposure signal.

According to this configuration, the representative luminance level of the long exposure signal in the face area (e.g. an average luminance level in the face area) is calculated using the luminance data of the weighting-processed long exposure signal. If the representative luminance level rises to the saturation level or higher, the exposure control using the long exposure signal and the short exposure signal is performed. Thus, appropriate exposure control is performed on the basis of the representative luminance level of the long exposure signal in the face area, which can suppress occurrence of a noise due to the short exposure signal (flickering) in the face area.

In the camera device of the present invention, if a reference luminance level that is subjected to a process of gradually bringing the luminance level to the representative luminance level as a target rises to the saturation level or higher, the exposure control unit performs exposure control using the long exposure signal and the short exposure signal.

According to this configuration, when the representative luminance level of the long exposure signal (e.g. the average luminance level in the face area) is calculated, the exposure control is performed using the reference luminance level (the luminance level gradually being brought to the representative luminance level as the target) instead of directly using the representative luminance level to perform exposure control (directly reflected in the exposure control). This can prevent the exposure control from being abruptly changed and thus prevent the screen from blinking.

An exposure control method of the present invention is used in a camera device including an imaging unit outputting a long exposure signal that is an image signal with a long exposure time and a short exposure signal that is an image signal with a short exposure time in a predetermined unit field period, and includes: detecting a face area from an image captured by the imaging unit; applying a weighting process to luminance data of the long exposure signal in the detected face area using a weighting constant for reducing the luminance level of the long exposure signal; and performing exposure control using the long exposure signal and the short exposure signal if the luminance level of the weighting-processed long exposure signal rises to a predetermined saturation level or higher.

Also with this method, if the face area is detected in the captured image, a weighting process for reducing the luminance level of the long exposure signal in the face area is performed as described above. As a result, in the face area, the luminance level of the long exposure signal is suppressed not to exceed the predetermined saturation level, which prevents the exposure control using the long exposure signal and the short exposure signal from being performed. This can suppress occurrence of the noise due to the short exposure signal (flickering) in the face area. Accordingly, visibility in the face area (particularly required in a surveillance camera etc.) is improved.

A program of the present invention is for exposure control in a camera device including an imaging unit outputting a long exposure signal that is an image signal with a long exposure time and a short exposure signal that is an image signal with a short exposure time in a predetermined unit field period, and causes a computer to perform: a process of detecting a face area from an image captured by the imaging unit; a process of applying a weighting process to luminance data of the long exposure signal in the detected face area using a weighting constant for reducing the luminance level of the long exposure signal; and a process of performing exposure control using the long exposure signal and the short exposure signal if the luminance level of the weighting-processed long exposure signal rises to a predetermined saturation level or higher.

Also with this program, if the face area is detected in the captured image, the weighting process for reducing the luminance level of the long exposure signal in the face area is performed as described above. As a result, in the face area, the luminance level of the long exposure signal is suppressed not to exceed the predetermined saturation level, which prevents the exposure control using the long exposure signal and the short exposure signal from being performed. This can suppress occurrence of the noise due to the short exposure signal (flickering) in the face area. Accordingly, visibility in the face area (particularly required in a surveillance camera etc.) is improved.

The present invention can suppress occurrence of a noise due to the short exposure signal (flickering) in the face area by applying the weighting process for reducing the luminance level of the long exposure signal in the detected face area, thereby improving visibility in the face area.

A camera device of an embodiment of the present invention will hereinafter be described with reference to the drawings. This embodiment exemplifies a case of a camera device used as a surveillance camera and the like. This camera device includes an exposure control function. This function is realized by a program stored in a memory or the like of the camera device.

A configuration of a camera device of an embodiment of the present invention will be described with reference to drawings. FIG. 1 is a block diagram showing the configuration of the camera device of this embodiment. As shown in FIG. 1, the camera device 1 includes an imaging unit 2 including an imaging element (CCD etc.). The imaging element of the imaging unit 2 includes a double speed driving function that outputs a long exposure signal (an image signal with a long exposure time) and a short exposure signal (an image signal with a short exposure time) in a field period. Driving of the imaging element is controlled by a timing pulse generating unit (TG unit) 3.

The camera device 1 further includes an analog signal processing unit 4 that applies a predetermined preprocess to the long exposure signal and the short exposure signal output from the imaging unit 2. The analog signal processing unit 4 includes a CDS unit 5 that applies a correlated double sampling process (CDS process) to the long exposure signal and the short exposure signal output from the imaging unit 2, an AGC unit 6 that applies auto gain control (AGC) to the long exposure signal and the short exposure signal having been subjected to the CDS process, and an A/D unit 7 that applies an analog/digital converting process (A/D converting process) to the long exposure signal and the short exposure signal having been subjected to the auto gain control.

Figure 2:
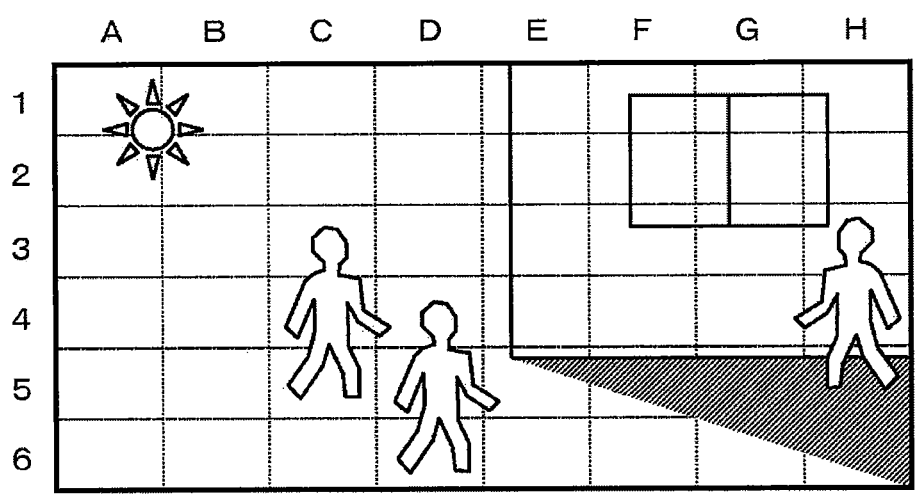
FIG. 2 is a diagram showing an example of an image captured by the camera device.

The camera device 1 further includes a face detection unit 8 that detects a face area included in an image captured by the imaging unit 2. FIG. 2 is a diagram showing an example of an image captured by the imaging unit 2. In the example shown in FIG. 2, the face detection unit 8 detects three areas "C3", "D4" and "H3" in the image as face areas. The face areas "C3" and "D4" are in a bright part (sunny part) in the image, and the face area "H3" is in a dark part (shady part) in the image. In this case, the face detection unit 8 detects a "face-like part" in the image by means of image matching or the like, and recognizes a quadrangular area (block) including the "face-like part" as the "face area". However, the scope of the present invention is not limited thereto. Instead, for instance, a "face-like part (a part of a face-like shape along the contour of the face)" may be regarded as a "face area".

The camera device 1 further includes a video processing unit 9 that applies a predetermined video processing to the long exposure signal and the short exposure signal output from the analog signal processing unit 4. The video processing unit 9 may be for instance a DSP, and includes various functions pertaining to the exposure control of the present invention. As shown in FIG. 1, the video processing unit 9 of this embodiment further includes a signal synthesizing unit 10 that synthesizes the long exposure signal and the short exposure signal. The signal synthesizing unit 10 has a function that synthesizes the long exposure signal and the short exposure signal and generates a video output signal with an expanded dynamic range.

The camera device 1 further includes a microcomputer 11 that controls operations of respective units (the TG unit 3, the analog signal processing unit 4, the video processing unit 9, the face detection unit 8, etc.). In other words, the operations of the TG unit 3, the analog signal processing unit 4, the video processing unit 9 and the face detection unit 8 are controlled by the microcomputer 11. For instance, the AGC unit 6 of the analog signal processing unit 4 is controlled by the microcomputer 11 so as to increase the gain of the long exposure signal in the entire area of the image if the detected luminance level of the long exposure signal in the face area is lower than a threshold level (if the face part is dark). The AGC unit 6 corresponds to an entire area gain control unit of the present invention.

As shown in FIG. 1, the microcomputer 11 includes a weighting processing unit 12, a gain control unit 13, a representative level calculation unit 14 and an exposure control unit 15.

The weighting processing unit 12 includes a function that applies a weighting process to luminance data of the long exposure signal in the face areas (e.g. three face areas "C3", "D4" and "H3") detected by the face detection unit 8 using a weighting coefficient A (0≤A<1) for reducing the luminance level of the long exposure signal. For instance, if the luminance level of the long exposure signal in the face area (e.g. the face area "H3") detected by the face detection unit 8 is lower than the threshold level (if the face part is dark), the weighting processing unit 12 is configured to apply the weighting process to the luminance data of the long exposure signal using a following expression.

Luminance data after weighting process Y'=luminance data of long exposure signal Y×Weighting coefficient A.

The gain control unit 13 includes a function (dark part correcting function) of increasing the gain of the long exposure signal of a dark part (a part less than the predetermined threshold level) if the dark part is included in the screen. In this case, if the luminance level of the long exposure signal in the face area (e.g. the face area "H3") detected by the face detection unit 8 is lower than the threshold level (if the face part is dark), the gain control unit 13 performs a process of increasing the gain of the long exposure signal in the face area in the image. Thus, the gain control unit 13 corresponds to a face area gain control unit 13 of the present invention.

The representative level calculation unit 14 includes a function of calculating a representative luminance level of the long exposure signal in the face area on the basis of the luminance data of the long exposure signal in the face area to which the weighting processing unit 12 has applied the weighting process. For instance, in a case where the three face areas "C3", "D4" and "H3" are detected in the image as shown in FIG. 2, the representative level calculation unit 14 calculates average values (average luminance level) of luminance levels of the three face areas "C3", "D4" and "H3" as the representative luminance levels. The average luminance level in the face area with the lowest luminance level among the three face areas "C3", "D4" and "H3" (the darkest face part among the three "H3") is used as the representative luminance level. The average value of the average luminance levels in the three face areas "C3", "D4" and "H3" may be used as the representative luminance level.

The exposure control unit 15 includes a function of performing an exposure control process that expands the dynamic range using the long exposure signal and the short exposure signal. If the luminance level of the weighted long exposure signal rises to a predetermined saturation level or higher, the exposure control unit 15 performs the exposure control using the long exposure signal and the short exposure signal. For instance, if the representative luminance level of the long exposure signal in the face area calculated by the representative level calculation unit 14 rises to the saturation level or higher, the exposure control unit 15 performs the exposure control using the long exposure signal and the short exposure signal.

If a reference luminance level that is subjected to a process of gradually bringing the luminance level to the representative luminance level as a target rises to the saturation level or higher, the exposure control unit 15 may perform the exposure control using the long exposure signal and the short exposure signal. For instance, in a case where the luminance level of "10" is calculated as the representative luminance level of the long exposure signal and the luminance level of the long exposure signal used for the current exposure control is "6", the exposure control unit 15 may control so as to increment the reference luminance level by "1" for each frame and bring the level to the target representative luminance level of "10" in four frames.

An operation of the camera device 1 configured as described above will be described with reference to drawings.

Figure 3:
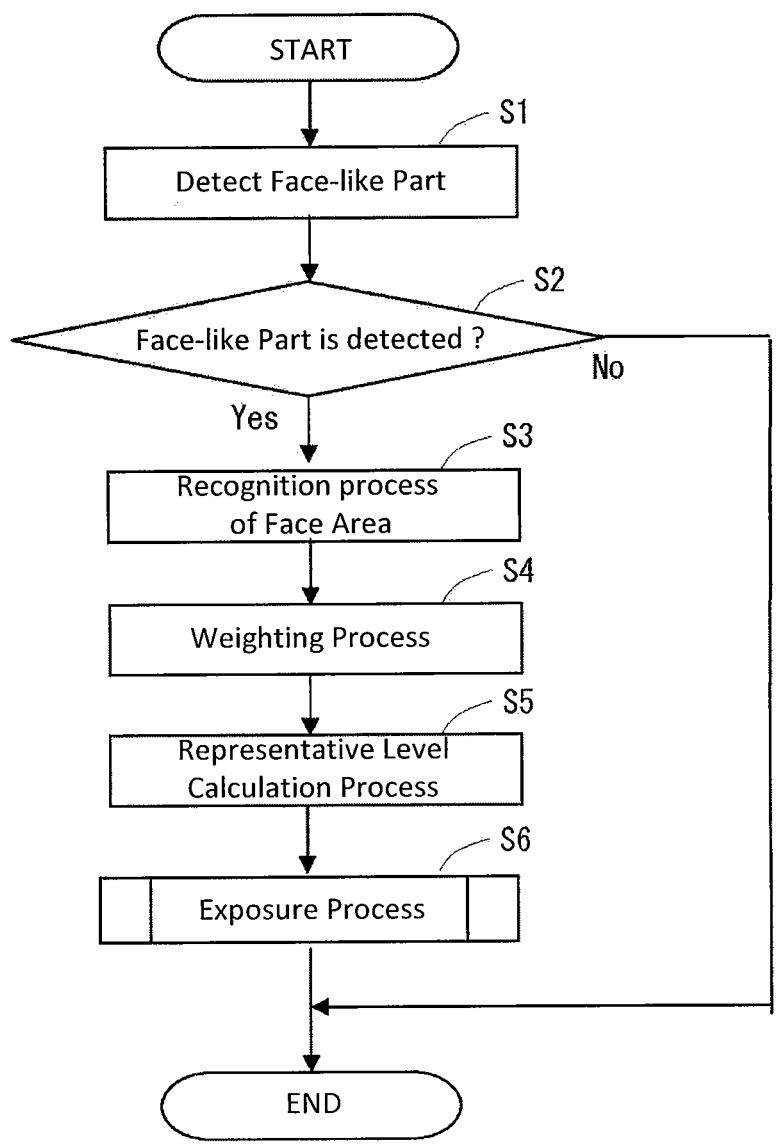
FIG. 3 is a flowchart showing the entire flow of a dynamic range expanding process in the embodiment of the present invention.

FIG. 3 is a flowchart showing the entire flow of a dynamic range expanding process in the camera device 1 of the embodiment of the present invention. As shown in FIG. 3, when the camera device 1 captures an image, an image processing such as image matching is applied to the captured image and a process of detecting the "face-like part" in the image is performed (S1). As a result, if the "face-like area" is detected in the image (S2), a quadrangular area (block) including the "face-like part" is recognized as the "face area" (S3). For instance, the three face areas "C3", "D4" and "H3" are thus detected.

Next, in the face areas "C3", "D4" and "H3" detected by the face detection unit 8, the weighting process is applied to the luminance data of the long exposure signal using weighting coefficient A (0≤A<1) for reducing the luminance level of the long exposure signal (S4). In this case, if the luminance level of the long exposure signal in the face area (e.g. the face area "H3") detected by the face detection unit 8 is lower than the threshold level (if the face part is dark), the weighting process is applied to the luminance data of the long exposure signal in the face area.

Subsequently, the process of calculating the representative luminance level of the long exposure signal in the face area is performed on the basis of the luminance data of the long exposure signal in the face area to which the weighting processing unit 12 has applied the weighting process (S5). For instance, the average luminance level in the face area "H3" with the lowest luminance level among the three face areas "C3", "D4" and "H3" is calculated as the representative luminance level.

If the luminance level of the weighted long exposure signal is at least a predetermined saturation level, the exposure control (electronic shutter control) is performed using the long exposure signal and the short exposure signal (S6). For instance, if the representative luminance level of the long exposure signal in the face area calculated by the representative level calculation unit 14 is the saturation level or higher, the exposure control is performed using the long exposure signal and the short exposure signal.

Figure 4:
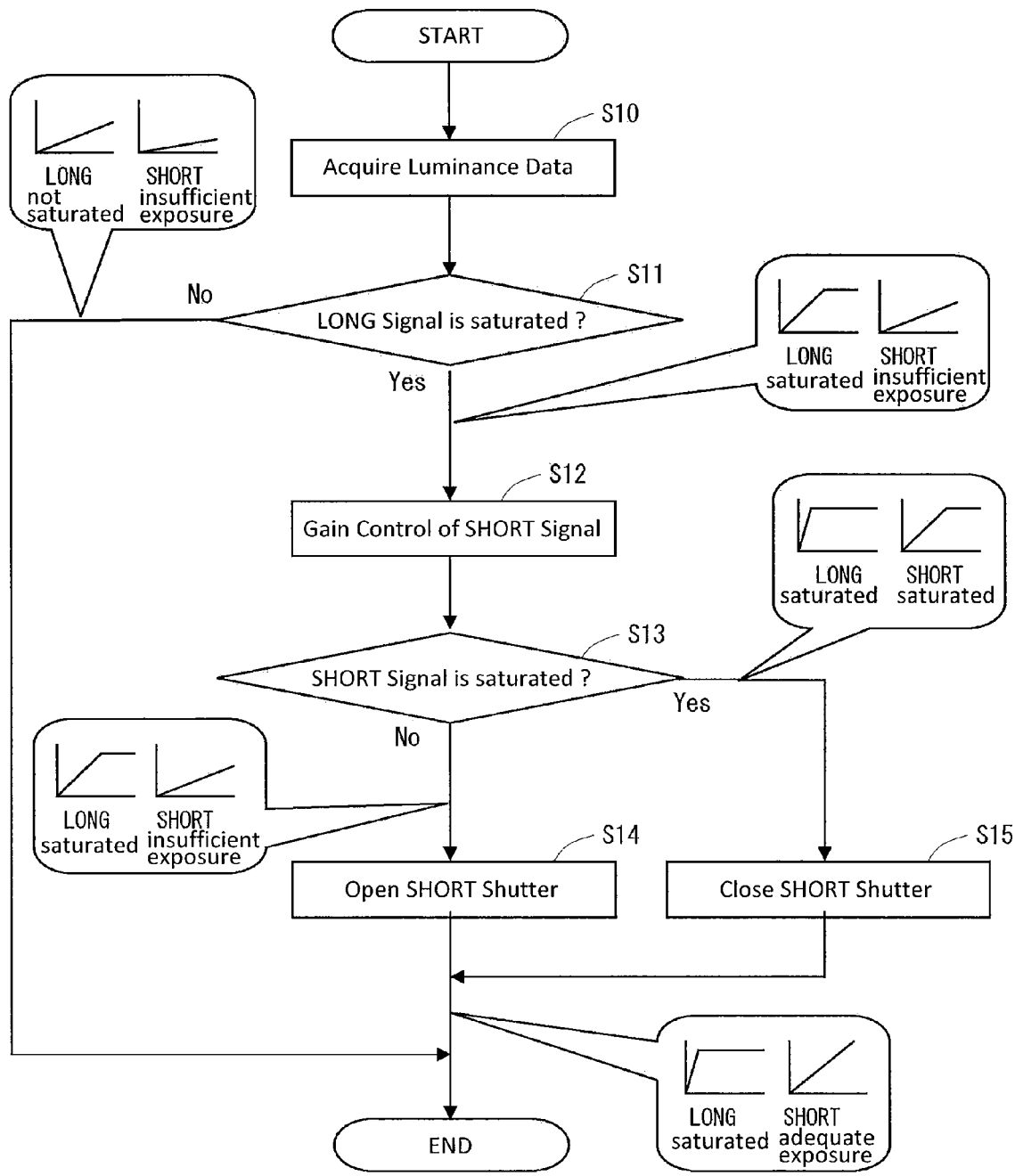
FIG. 4 is a flowchart showing a flow of an exposure control (electronic shutter control) process of the camera device.

Here, the processing details of the exposure control (electronic shutter control) are described with reference to FIG. 4. FIG. 4 is a flowchart showing a flow of the exposure control process.

As shown in FIG. 4, in the exposure control, first, the luminance data of the long exposure signal and the short exposure signal is acquired (S10). In this case, the weighting process has been applied to the luminance data of the long exposure signal in the face areas "C3", "D4" and "H3". It is determined whether the luminance level of the long exposure signal is at least the saturation level or not (S11). If the luminance level of the long exposure signal is lower than the saturation level, the exposure control using the long exposure signal and the short exposure signal is not performed. On the other hand, if the luminance level of the long exposure signal is at least the saturation level, the gain control that increases the luminance level of the short exposure signal is performed (S12).

After the gain control of the short exposure signal is performed, it is determined whether the short exposure signal is at least saturation level or not (S13). If the short exposure signal is lower than the saturation level, a control that increases the exposure time of the short exposure signal (control of opening the electronic shutter for the short exposure signal) is performed (S14). On the other hand, if the short exposure signal is at least the saturation level, a control that reduces the exposure time of the short exposure signal (control of closing the electronic shutter for the short exposure signal) is performed (S15). Thus, the appropriate exposure control using the long exposure signal and the short exposure signal is performed.

This camera device 1 of the embodiment of the present invention can suppress occurrence of a noise due to the short exposure signal (flickering) at the face area by applying the weighting process for reducing the luminance level of the long exposure signal in the face areas "C3", "D4" and "H3" detected from the captured image, thereby increasing visibility in the face areas "C3", "D4" and "H3".

That is, in this embodiment, if the face areas "C3", "D4" and "H3" are detected in the captured image, the weighting process for reducing the luminance level of the long exposure signal is performed in the face areas. As a result, in the face area, the luminance level of the long exposure signal is suppressed not to exceed a predetermined saturation level, which prevents the exposure control using the long exposure signal and the short exposure signal from being performed. This can suppress occurrence of the noise due to the short exposure signal (flickering) in the face area. Accordingly, the visibility in the face areas "C3", "D4" and "H3" (particularly required in a surveillance camera etc.) is improved.

In this embodiment, if the luminance level of the face area "H3" is low (if it is dark), the weighting process for reducing the luminance level of the long exposure signal is performed in the face area, which suppresses occurrence of the noise due to the short exposure signal (flickering) in the face area. Accordingly, visibility in the face area "H3" in the dark part (particularly required in a surveillance camera etc.) is improved.

In this embodiment, if the luminance level in the face area "H3" is low (if it is dark), a control for increasing the gain of the long exposure signal is performed in the face area. This can improve the visibility in the face area "H3" in the dark part (particularly required in a surveillance camera etc.).

In this embodiment, if the luminance of the face area "H3" is low (if it is dark), the control for increasing the gain of the long exposure signal is performed in the entire area "A1-H6" of the image. This can improve the visibility in the face area "H3" in the dark part (particularly required in a surveillance camera etc.). In this case, the gain control is applied even to a part that is not dark. However, appropriate exposure control using the long exposure signal and the short exposure signal is applied to this part (the part that is not dark).

In this embodiment, the representative luminance level of the long exposure signal in the face areas "C3", "D4" and "H3" (e.g. the average luminance level in the face area "H3") is calculated using the luminance data of the weighting-processed long exposure signal. If the representative luminance level rises to the saturation level or higher, the exposure control is performed using the long exposure signal and the short exposure signal. As described above, the appropriate exposure control is performed on the basis of the representative luminance level of the long exposure signal in the face area, which can suppress occurrence of the noise due to a short exposure signal (flickering) in the face area.

In this embodiment, when the representative luminance level of the long exposure signal (e.g. the average luminance level in the face area "H3") is calculated, the exposure control is performed using the reference luminance level (the luminance level gradually being brought to the representative luminance level as a target) instead of directly using the representative luminance level to perform exposure control (direct reflection in the exposure control). This can prevent the exposure control from being abruptly changed and thus prevent the screen from blinking.

Thus, the embodiments of the present invention have exemplarily been described. However, the scope of the present invention is not limited thereto, and can be changed and modified according to objects within the scope set forth in the claims.

The currently conceivable preferred embodiments of the present invention have been described above. However, it is understood that various modifications can be made to these embodiments, and it is intended that the scope of the appended claims includes all such modifications falling within the true spirit and scope of the present invention.

INDUSTRIAL APPLICABILITY

As described above, the camera device according to the present invention has advantageous effects that can suppress occurrence of the noise due to the short exposure signal (flickering) in the face area and improve the visibility in the face area, and is effectively used as a surveillance camera and the like.

REFERENCE SIGNS LIST

1 camera device
2 imaging unit
3 timing pulse generating unit (TG unit)
4 analog signal processing unit
5 CDS unit
6 AGC unit
7 A/D unit
8 face detection unit
9 video processing unit
10 signal synthesizing unit
11 microcomputer
12 weighting processing unit
13 gain control unit
14 representative level calculation unit
15 exposure control unit

The invention claimed is:
1. A camera device, comprising:
an imager that outputs a long exposure signal and a short exposure signal, the long exposure signal being an image signal with a long exposure time and the short exposure signal being an image signal with a short exposure time in a predetermined unit field period;
a face detector that detects a face area from an image captured by the imager;
a weighting processor that applies, when the face detector detects the face area, a weighting process to a luminance level of the long exposure signal in the detected face area using a weighting constant to reduce the luminance level of the long exposure signal in the detected face area; and
an exposure controller that performs exposure control using the long exposure signal and the short exposure signal when the reduced luminance level of the long exposure signal in the detected face area is equal to or higher than a predetermined saturation level, and is prevented from performing the exposure control using the long exposure signal and the short exposure signal when the reduced luminance level of the long exposure signal in the detected face area is lower than the saturation level.
2. The camera device according to claim 1, wherein when the luminance level of the long exposure signal in the detected face area is lower than a predetermined threshold level, the weighting processor applies the weighting process to the luminance level of the long exposure signal to reduce the luminance level of the long exposure signal.

3. The camera device according to claim 1, further comprising a face area gain controller that increases a gain of the long exposure signal in the detected face area in the image, when the luminance level of the long exposure signal in the detected face area is lower than a predetermined threshold level.

4. The camera device according to claim 1, further comprising an entire area gain controller that increases a gain of the long exposure signal in an entire area of the image when the luminance level of the long exposure signal in the detected face area is lower than a predetermined threshold level.

5. The camera device according to claim 1, further comprising a representative level calculator that calculates a representative luminance level of the long exposure signal in the detected face area on the basis of the reduced luminance level of the long exposure signal,
wherein when the representative luminance level is equal to or higher than the saturation level, the exposure controller performs the exposure control using the long exposure signal and the short exposure signal.

6. The camera device according to claim 5, wherein when a reference luminance level, which is subjected to a process of gradually bringing the luminance level to the representative luminance level as a target, is equal to or higher than the saturation level, the exposure controller performs the exposure control using the long exposure signal and the short exposure signal.

7. The camera device according to claim 1, wherein the exposure controller performs exposure control using the long exposure signal and the short exposure signal in the detected face area, when the reduced luminance level of the long exposure signal is equal to or higher than the predetermined saturation level, and
the exposure controller performs exposure control using the long exposure signal and the short exposure signal in an area other than the detected face area, when the luminance level of the long exposure signal output by the imager is equal to or higher than the predetermined saturation level.

8. The camera device according to claim 1, wherein the exposure controller determines, in the detected face area, whether or not the reduced luminance level of the long exposure signal is equal to or higher than the predetermined saturation level, and
the exposure controller determines, in an area other than the detected face area, whether or not the luminance level of the long exposure signal output by the imager is equal to or higher than the predetermined saturation level.

9. The camera device according to claim 8, wherein, in the detected face area, when the exposure controller determines that the reduced luminance level of the long exposure signal is equal to or higher than the saturation level, a gain of the short exposure signal is increased, and
in the area other than the detected face area, when the exposure controller determines that the luminance level of the long exposure signal output by the imager is equal to or higher than the saturation level, a gain of the short exposure signal is increased.

10. An exposure control method used in a camera device including an imager outputting a long exposure signal and a short exposure signal, the long exposure signal being an image signal with a long exposure time and a short exposure signal being an image signal with a short exposure time in a predetermined unit field period, the method comprising:
detecting a face area from an image captured by the imager;
applying, when the face area is detected, a weighting process to a luminance level of the long exposure signal in the detected face area using a weighting constant to reduce the luminance level of the long exposure signal in the detected face area; and
performing exposure control using the long exposure signal and the short exposure signal when the reduced luminance level of the long exposure signal in the detected face area is equal to or higher than a predetermined saturation level, and preventing the performance of the exposure control using the long exposure signal and the short exposure signal when the reduced luminance level of the long exposure signal in the detected face area is lower than the saturation level.

11. A non-transitory computer readable recording medium storing a program for exposure control in a camera device including an imager outputting a long exposure signal and a short exposure signal, the long exposure signal being an image signal with a long exposure time and a short exposure signal being an image signal with a short exposure time in a predetermined unit field period, the program causing a computer to perform:
detecting a face area from an image captured by the imager;
applying, when the face area is detected, a weighting process to a luminance level of the long exposure signal in the detected face area using a weighting constant to reduce the luminance level of the long exposure signal in the detected face area; and
performing exposure control using the long exposure signal and the short exposure signal when the reduced luminance level of the long exposure signal in the detected face area is equal to or higher than a predetermined saturation level, and preventing the performance of the exposure control using the long exposure signal and the short exposure signal when the reduced luminance level of the long exposure signal in the detected face area is lower than the saturation level.

* * * * *